US012402677B2

(12) United States Patent
Ding

(10) Patent No.: US 12,402,677 B2
(45) Date of Patent: Sep. 2, 2025

(54) FABRIC RESISTANT TO LIQUID PENETRATION

(71) Applicant: The Commonwealth of Australia, Edinburgh (AU)

(72) Inventor: Jie Ding, Edinburgh (AU)

(73) Assignee: THE COMMONWEALTH OF AUSTRALIA, Edinburgh (AU)

(*) Notice: Subject to any disclaimer, the term of this patent is extended or adjusted under 35 U.S.C. 154(b) by 112 days.

(21) Appl. No.: 17/928,244

(22) PCT Filed: May 3, 2021

(86) PCT No.: PCT/AU2021/050402
§ 371 (c)(1),
(2) Date: Nov. 28, 2022

(87) PCT Pub. No.: WO2021/237271
PCT Pub. Date: Dec. 2, 2021

(65) Prior Publication Data
US 2024/0049822 A1    Feb. 15, 2024

(30) Foreign Application Priority Data
May 27, 2020 (AU) .............................. 2020901722

(51) Int. Cl.
*A41D 31/10* (2019.01)
*A41D 1/00* (2018.01)
(Continued)

(52) U.S. Cl.
CPC .............. *A41D 31/10* (2019.02); *A41D 1/00* (2013.01); *A41D 31/14* (2019.02); *B32B 5/024* (2013.01);
(Continued)

(58) Field of Classification Search
CPC ........ A41D 31/10; A41D 31/14; B32B 5/262; B32B 7/02; B32B 9/007; B32B 2255/02; B32B 2255/24; B32B 2307/7265
See application file for complete search history.

(56) References Cited

U.S. PATENT DOCUMENTS 4,461,099 A     7/1984   Bailly
5,024,594 A *   6/1991   Athayde ................ A62B 17/00
                                                        442/67
(Continued)

FOREIGN PATENT DOCUMENTS

CN    105476130    4/2016
CN    109208330    1/2019
(Continued)

OTHER PUBLICATIONS

Machine translation of CN 105476130 A obtained from Google Patents on Sep. 3, 2024.*
(Continued)

*Primary Examiner* — Joanna Pleszczynska
(74) *Attorney, Agent, or Firm* — HANLEY, FLIGHT & ZIMMERMAN, LLC

(57) ABSTRACT

Described embodiments generally relate to a garment for resisting penetration of a liquid. The garment comprises an outer layer, and an inner layer. The inner layer is configured to be positioned closer to the skin of a wearer than the outer layer when the garment is being worn. Each of the inner layer and the outer layer on their own are wettable by the liquid, and the inner layer has a lower wettability to the liquid than the outer layer. The configuration of inner and outer layers creates a wettability difference that biases the outer layer to absorb the liquid and the inner layer to resist penetration of the liquid in a direction moving from the outer layer to the inner layer.

23 Claims, 8 Drawing Sheets

(51) Int. Cl.
  *A41D 31/14* (2019.01)
  *B32B 5/02* (2006.01)
  *B32B 5/26* (2006.01)
  *B32B 7/02* (2019.01)
  *B32B 9/00* (2006.01)
  *B32B 9/04* (2006.01)

(52) U.S. Cl.
  CPC ............... *B32B 5/262* (2021.05); *B32B 7/02* (2013.01); *B32B 9/007* (2013.01); *B32B 9/047* (2013.01); *B32B 2255/02* (2013.01); *B32B 2255/24* (2013.01); *B32B 2255/26* (2013.01); *B32B 2262/0276* (2013.01); *B32B 2262/062* (2013.01); *B32B 2307/724* (2013.01); *B32B 2307/7265* (2013.01); *B32B 2307/73* (2013.01); *B32B 2437/00* (2013.01)

(56) References Cited

U.S. PATENT DOCUMENTS

| | | | |
|---|---|---|---|
| 5,210,882 | A | 5/1993 | Moretz et al. |
| 6,806,214 | B2 | 10/2004 | Li et al. |
| 2009/0205116 | A1 | 8/2009 | Stone et al. |
| 2012/0276332 | A1 | 11/2012 | Conolly et al. |
| 2012/0311763 | A1* | 12/2012 | King .................. A41D 3/00 2/87 |

FOREIGN PATENT DOCUMENTS

| | | |
|---|---|---|
| CN | 211390448 | 9/2020 |
| JP | 2008188925 A | 8/2008 |
| WO | 2004089614 A2 | 10/2004 |

OTHER PUBLICATIONS

International Searching Authority, "International Search Report," issued in connection with International Application No. PCT/AU2021/050402, mailed on Jul. 16, 2021, 7 pages.

International Searching Authority, "Written Opinion," issued in connection with International Application No. PCT/AU2021/050402, mailed on Jul. 16, 2021, 9 pages.

International Searching Authority, "Second Written Opinion," issued in connection with International Application No. PCT/AU2021/050402, mailed on Apr. 22, 2022, 9 pages.

International Searching Authority, "Third Written Opinion," issued in connection with International Application No. PCT/AU2021/050402, mailed on Jul. 11, 2022, 11 pages.

International Searching Authority, "International Preliminary Report on Patentability," issued in connection with International Application No. PCT/AU2021/050402, mailed on Sep. 9, 2022, 35 pages.

Wang et al., "Selective, Spontaneous One-Way Oil-Transport Fabrics and Their Novel Use for Gauging Liquid Surface Tension," ACS Applied Materials & Interfaces, 2015, 7(41), pp. 22874-22880, 7 pages.

Wang et al., "Durable, Self-Healing Superhydrophobic and Superoleophobic Surfaces from Fluorinated-Decyl Polyhedral Oligomeric Silsesquioxane and Hydrolyzed Fluorinated Alkyl Silane," Angewandte Chemie, 2015, 50(48), pp. 11433-11436, 4 pages.

IP Australia, "International-type search report" issued in connection with Australian Patent Application No. 2020901722, dated Jul. 14, 2020, 20 pages.

Wang et al., "Directional water-transfer through fabrics induced by asymmetric wettability," Journal of Materials Chemistry, vol. 20, No. 37, published Aug. 11, 2010, 4 pages.

Intellectual Property Office of the United Kingdom, "First Examination Report" issued in connection with UK Application No. GB2219515.0 on Apr. 10, 2024, 4 pages.

Intellectual Property Office of the United Kingdom, "Second Examination Report" issued in connection with UK Application No. GB2219515.0 on Jul. 24, 2024, 3 pages.

* cited by examiner

FABRIC RESISTANT TO LIQUID PENETRATION

RELATED APPLICATIONS

This patent arises from the U.S. national stage of International Patent Application Serial No. PCT/AU2021/050402, having an international filing date of May 3, 2021, which is hereby incorporated by reference in its entirety. Further, this patent claims priority to Australian Patent Application No. 2020901722, which was filed on May 27, 2020.

TECHNICAL FIELD

Embodiments generally relate to fabrics and garments that are resistant to liquid penetration, as well as to methods for the production of such fabrics and garments.

BACKGROUND

Liquid resistant fabrics are often required in scenarios relating to keeping people or products dry or protected from particular liquids. For example, in the field of protective clothing, fabrics that are resistant to liquid chemicals are highly desirable. Exposure to toxic industrial chemicals (TICs) and chemical warfare agents (CWAs) can cause health problems or even lead to death of humans and animals. To protect people from contacting the hazardous liquids, protective clothing is essential. Semi-permeable and impermeable materials provide good barriers to penetration of chemical agents in liquid, vapor, and aerosol form, but can lead to serious heat stress consequences for users. Air and moisture permeable fabrics are preferred for their breathability and comfort.

Currently, chemical protective clothing (CPC) is designed and manufactured based on the principle of maximum possible repellency and absorption. Specifically, CPC is often designed with the outer shell fabric coated with a liquid repellent coating to offer liquid repellency, while an inner fabric that is designed to contact the skin is often an absorptive material providing liquid and gas absorption. However, current CPC is not capable of repelling hazardous chemicals with a low surface tension. Extensive efforts have been made to increase the repellency of the outer shell layer and the absorption or thickness of the inner layer, but these methods have had limited success while maintaining air-permeability, which is important for maintaining comfort for the wearer. No one fabric is able to repel all liquids.

It is desired to address or ameliorate one or more shortcomings or disadvantages associated with prior fabrics that are resistant to liquid penetration, or to at least provide a useful alternative thereto.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In this document, a statement that an element may be "at least one of" a list of options is to be understood to mean that the element may be any one of the listed options, or may be any combination of two or more of the listed options.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Some embodiments relate to a garment for resisting penetration of a liquid, the garment comprising:
an outer layer; and
an inner layer;
wherein the inner layer is configured to be positioned closer to the skin of a wearer than the outer layer when the garment is being worn;
wherein each of the inner layer and the outer layer on their own are wettable by the liquid;
wherein the inner layer has a lower wettability to the liquid than the outer layer; and
wherein the configuration of inner and outer layers creates a wettability difference that biases the outer layer to absorb the liquid and the inner layer to resist penetration of the liquid in a direction moving from the outer layer to the inner layer.

In some embodiments, when worn with the inner layer positioned closer to the skin of the wearer than the outer layer, the garment provides greater resistance to penetration of the liquid toward the skin of the wearer than either a garment made from either the inner layer or the outer layer on its own, or than a garment worn with the outer layer positioned closer to the skin of a wearer than the inner layer.

According to some embodiments, the liquid is a low surface tension liquid. In some embodiments, the surface tension of the liquid is less than 50 mMm$^{-1}$. In some embodiments, the surface tension of the liquid is less than 40 mMm$^{-1}$. According to some embodiments, the surface tension of the liquid is less than 30 mMm$^{-1}$.

In some embodiments, the garment is air-permeable.

According to some embodiments, the inner layer and the outer layer both repel high surface tension liquids. In some embodiments, the inner layer and the outer layer both absorb high surface tension liquids. In some embodiments, the inner layer repels high surface tension liquids. According to some embodiments, the outer layer absorbs high surface tension liquids. In some embodiments, the absorption layer and the resistant layer both comprise at least one of a hydrophobic or super hydrophobic material.

In some embodiments, the inner layer comprises a coating. In some embodiments, the outer layer comprises a coating. According to some embodiments, the coating is applied using a dip coating method. According to some embodiments, the coating is applied using a spray coating method. In some embodiments, the inner layer and the outer layer are formed from a single sheet, with the inner layer being created by applying a coating to a surface of the sheet, and the outer layer being created from the uncoated portion of the sheet.

Some embodiments further comprise an inner comfort layer that is configured to be positioned to be closer to the skin than the inner layer, wherein the inner comfort layer has a higher wettability than the inner layer. In some embodiments, the inner comfort layer absorbs high surface tension liquids.

Some embodiments further comprise an outer rinsable layer that is configured to be positioned to be further from the skin than the outer layer, wherein the outer rinsable layer has a lower wettability than the outer layer. In some embodiments, the outer rinsable layer repels high surface tension liquids.

Some embodiments further comprise a carbon layer that is configured to absorb vapour, wherein the carbon layer is positioned to be closer to the skin than the outer layer. In some embodiments, the carbon layer comprises activated carbon.

According to some embodiments, a difference in the capillary contact angle between the outer absorption layer and the inner resistant layer is at least 50°. In some embodiments, the difference in the capillary contact angle between the outer absorption layer and the inner resistant layer is at least 60°. In some embodiments, the difference in the capillary contact angle between the outer absorption layer and the inner resistant layer is at least 65°.

According to some embodiments, the garment is configured to cover at least one of a torso, an arm, a leg, a face, a hand or a foot of the wearer when the garment is being worn.

In some embodiments, the garment comprises at least one of a coverall, a jacket, a pair of pants, a vest, a facemask, a glove or a sock.

Some embodiments relate to a layered fabric for resisting penetration of a liquid, the fabric comprising:
an outer layer; and
an inner layer;
wherein the inner layer is configured to be positioned closer to the skin of a wearer than the outer layer when the fabric is being worn; and
wherein each of the inner layer and the outer layer on their own are wettable by the liquid;
wherein the inner layer has a lower wettability than the outer layer; and
wherein the configuration of inner and outer layers creates a wettability difference that biases the outer layer to absorb the liquid and the inner layer to resist penetration of the liquid in a direction moving from the outer layer to the inner layer.

According to some embodiments, when worn with the inner layer positioned closer to the skin of the wearer than the outer layer, the fabric provides greater resistance to penetration of the liquid toward the skin of the wearer than either a fabric made from either the inner layer or the outer layer on its own, or than a fabric worn with the outer layer positioned closer to the skin of a wearer than the inner layer.

According to some embodiments, the liquid is a low surface tension liquid. In some embodiments, the surface tension of the liquid is less than 50 $mMm^{-1}$. In some embodiments, the surface tension of the liquid is less than 40 $mMm^{-1}$. According to some embodiments, the surface tension of the liquid is less than 30 $mMm^{-1}$.

In some embodiments, the garment is air-permeable.

According to some embodiments, the outer layer and the inner layer both repel high surface tension liquids. According to some embodiments, the outer layer and the inner layer both absorb high surface tension liquids. In some embodiments, the inner layer repels high surface tension liquids. In some embodiments, the outer layer absorbs high surface tension liquids. According to some embodiments, the absorption layer and the resistant layer both comprise at least one of a hydrophobic or super hydrophobic material.

According to some embodiments, the inner layer comprises a coating. In some embodiments, the outer layer comprises a coating. In some embodiments, the coating is applied using a dip coating method. According to some embodiments, the coating is applied using a spray coating method. In some embodiments, the inner layer and the outer layer are formed from a single sheet, with the inner layer being created by applying a coating to a surface of the sheet, and the outer layer being created from the uncoated portion of the sheet.

Some embodiments further comprise an inner comfort layer that is configured to be positioned to be closer to the skin than the inner layer, wherein the inner comfort layer has a higher wettability than the inner layer. In some embodiments, the inner comfort layer absorbs high surface tension liquids.

Some embodiments further comprise an outer rinsable layer that is configured to be positioned to be further from the skin than the outer layer, wherein the outer rinsable layer has a lower wettability than the outer layer. In some embodiments, the outer rinsable layer repels high surface tension liquids.

Some embodiments further comprise a carbon layer that is configured to absorb vapour, wherein the carbon layer is positioned to be closer to the skin than the outer layer. In some embodiments, the carbon layer comprises activated carbon.

According to some embodiments, a difference in the capillary contact angle between the outer absorption layer and the inner resistant layer is at least 50°. In some embodiments, the difference in the capillary contact angle between the outer absorption layer and the inner resistant layer is at least 60°. In some embodiments, the difference in the capillary contact angle between the outer absorption layer and the inner resistant layer is at least 65°.

BRIEF DESCRIPTION OF DRAWINGS

Embodiments are described in further detail below, by way of example and with reference to the accompanying drawings, in which.

DETAILED DESCRIPTION

Embodiments generally relate to fabrics and garments that are resistant to liquid penetration, as well as to methods for the production of such fabrics and garments. In particular, described embodiments relate to fabrics and materials that use the principle of wettability competition to improve the effectiveness of the protection provided by the fabrics and materials against liquid penetration.

Air and moisture permeable fabrics are widely used for chemical protection. Air and moisture permeable fabrics allow a convective flow of air and moisture around the body, operating as a breathable barrier. However, existing fabrics used for permeable chemical protective clothing (CPC) do not perform well at repelling liquids with a low surface tension. Low surface tension liquids may include ethanol, 2-chloroethyl phenyl sulfide, diethyl chlorophosphate, triethyl phosphate, and diisopropyl methylphosphonate. According to some embodiments, a low surface tension liquid may be any liquid with a surface tension of less than 50 mNm$^{-1}$. According to some embodiments, a low surface tension liquid may be any liquid with a surface tension of less than 40 mNm$^{-1}$. According to some embodiments, a low surface tension liquid may be any liquid with a surface tension of less than 30 mNm$^{-1}$.

Described embodiments are designed to exploit a synergistic effect or wettability competition mechanism. Specifically, the wettability competition mechanism relates to the phenomenon whereby when placing a lower wettability layer underneath a higher wettability layer within a fabric, the fabric will resist liquid penetration in the direction moving from the high wettability layer to the low wettability layer, even where each layer on its own is wettable by or susceptible to penetration by target liquids. This phenomenon is particularly seen in cases where the difference in wettability between the two layers is high.

While the terms high wettability and low wettability are used, it is to be understood that these terms are relative to each other, and that it is the difference in wettability between the layers that allows for fabrics to resist penetration by a target liquid. Both layers may be wettable by the target liquid, which may be a low surface tension liquid.

Figure 1:
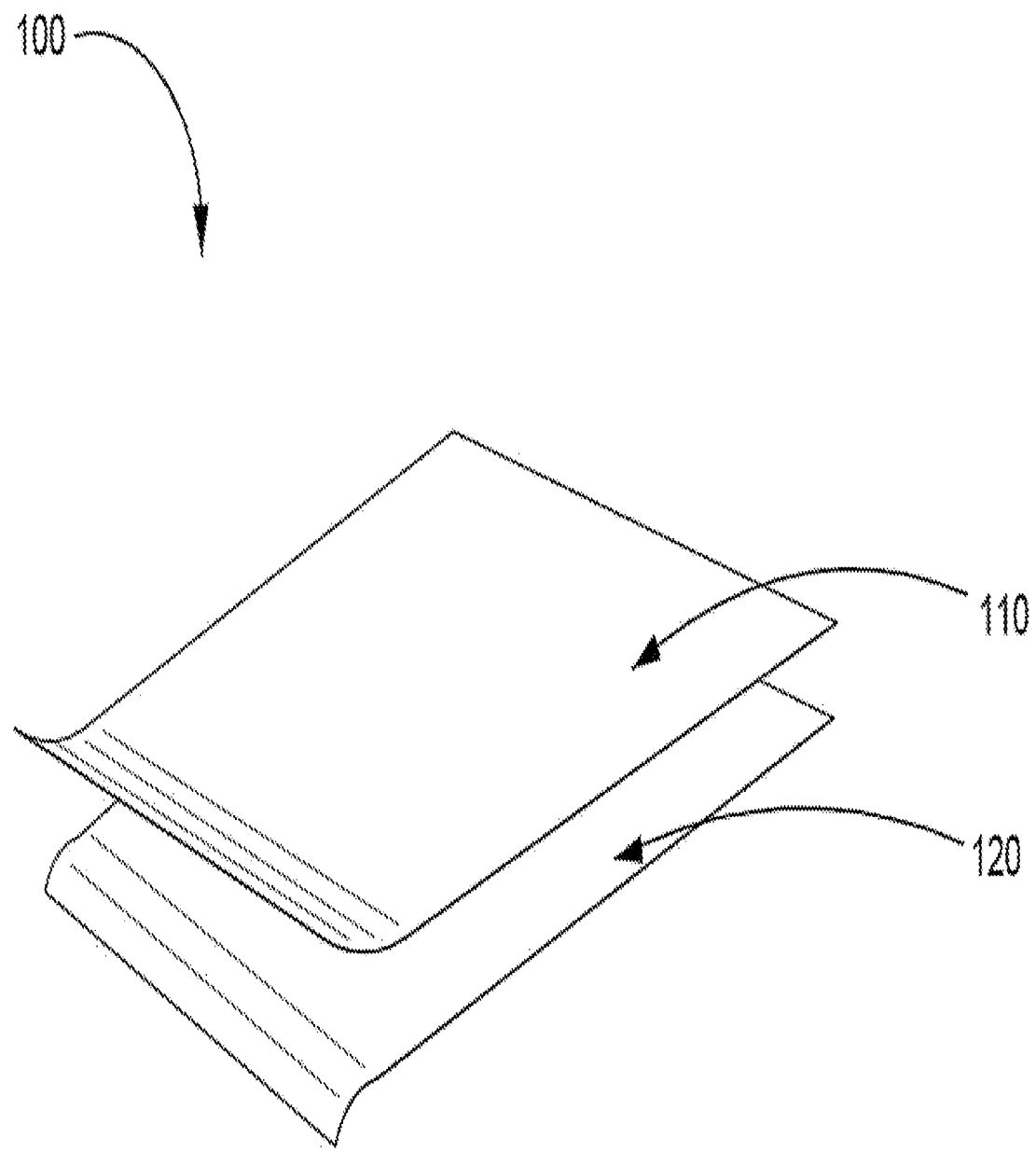
FIG. 1 shows a previously known layered fabric.

FIG. 1 shows a previously used layered fabric 100 for resisting liquid penetration. Layered fabric 100 comprises an outer layer 110 comprising a sheet of material having a low wettability. Outer layer 110 may be an outer layer in that it may be designed to be placed away from the skin of a user or the product that is being protected by fabric 100, and is instead exposed to the environment in use. Wettability is a measure of how well a liquid wets or adheres to a solid, so a material having a low wettability will not absorb liquid easily. Liquid dropped onto a low wettability material will tend to be suspended above the material with a high contact angle for a longer period of time. For example, a small amount of low surface tension liquid such as 10 μL ethanol dropped onto a low wettability material such as coated polyester may have an initial contact angle of 115° and may hold this contact angle for around 30 seconds before being absorbed.

Layered fabric 100 further comprises an inner layer 120 comprising a sheet of material having a high wettability. Inner layer 120 may be an inner layer in that it is designed to be placed against or adjacent to the skin of a user or a product that is being protected by fabric 100 in use. A material having a high wettability will tend to absorb liquid easily. Liquid dropped onto a high wettability material will tend to be absorbed into or spread over the material, exhibiting a higher contact angle for a shorter period of time. For example, a small amount of low surface tension liquid such as 10 μL ethanol dropped onto a high wettability material such as uncoated polyester may have an initial contact angle of 20° and may hold this contact angle for less than 1 second before being absorbed.

While layers 110 and 120 may both be wettable by low surface tension liquids and may both have a static contact angle (CA) of 0° for low surface tension liquids in some embodiments, the difference in the amount of time it takes for a liquid to spread over the surface of layers 110 and 120 shows that they have differing wettabilities to the liquid.

When a liquid comes in contact with layer 110, the low wettability of layer 110 resists absorption of the liquid, resulting in the liquid tending to remain on the surface of layer 110 rather than being absorbed. However, a liquid with a low surface tension will eventually be absorbed by layer 110, especially after being exposed to layer 110 for a long duration. As the liquid passes through layer 110, it is then quickly absorbed by layer 120. However, as described below, layered fabric 100 may still allow penetration of liquid in some circumstances.

Figure 2:
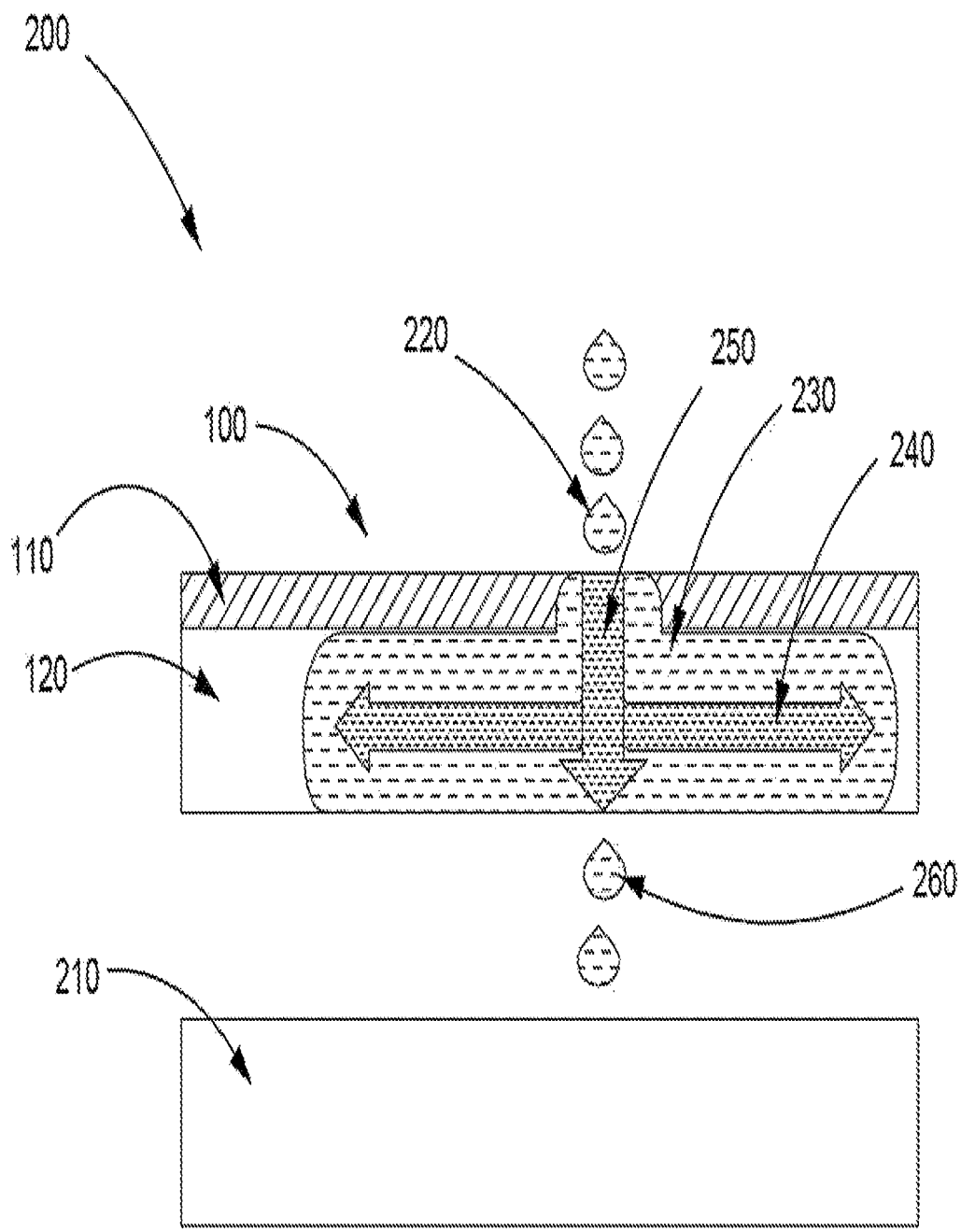
FIG. 2 shows liquid passing through the fabric of FIG. 1.

FIG. 2 shows the path of the liquid 220 with respect to a layered fabric 100 that is in contact with a wearer's skin 210.

Liquid 220 starts by dropping onto the surface of layer 110. As described above, the liquid 220 may eventually penetrate through layer 110, as shown by penetrated liquid 230, especially where liquid 220 is a liquid with a low surface tension. Some of penetrated liquid 230 is absorbed along the direction shown by arrows 240, along the length of layer 120 of fabric 100. However, some of penetrated liquid 230 will eventually penetrate through layer 120 along the direction of arrow 250, especially after a long duration of time has passed or a high volume of liquid 220 has been penetrated. This becomes liquid 260, which is free to contact skin 210. Fabrics such as fabric 100 promote liquid penetration toward skin 210, as the layer in contact with the skin, being layer 120, has higher wettability.

An example of a low surface tension liquid is pure ethanol. An experiment done by dropping 200 μL ethanol onto a dual layer fabric similar to fabric 100 showed that the ethanol slowly spread on the top of the fabric, then moved freely through the fabric, and quickly spread to the bottom layer, as illustrated in FIG. 2. From the outer surface to the inner surface, the ethanol penetrated through the fabric in 0.72 seconds.

Attempts have been made to improve the liquid protection capability of fabrics such as layered fabric 100 by enhancing the liquid repellency, hydrophobicity or oleophobicity of the lower wettability layer 110, and/or by increasing absorption or hydrophilicity of the higher wettability layer 120. For example, coating techniques using fluorine-containing chemicals and nanomaterials have been used. However, it is difficult to prevent penetration of low surface tension liquids, such as low surface chemical warfare agents, using a superoleophobic material. Prior methods for increasing the liquid repellency may also decrease the breathability of fabric 100, and may increase the thickness and weight of fabric 100 in some cases.

FIGS. 3, 4, 7 and 8 illustrate alternative layered fabrics 300, 700 and 800 that operate in a different way. Instead of concentrating on improving the inherent functions of each layer, fabrics 300, 700 and 800 use the interaction between fabric layers to improve the prevention of liquid penetration. As described in further detail below, fabrics 300, 700 and 800 may provide an improved resistance to liquid penetration compared to fabric 100, especially for liquids having a low surface tension. Fabrics 300, 700 and 800 may be designed to exploit a synergistic effect or wettability competition mechanism. Specifically, the wettability competition mechanism relates to the phenomenon whereby when placing a lower wettability layer underneath a higher wettability layer within the fabric, the fabric will resist liquid penetration in the direction moving from the high wettability layer to the low wettability layer, even where each layer on its own is wettable by or susceptible to penetration by low surface tension liquids. This phenomenon is particularly seen in cases where the difference in wettability between the two layers is high.

Figure 3:
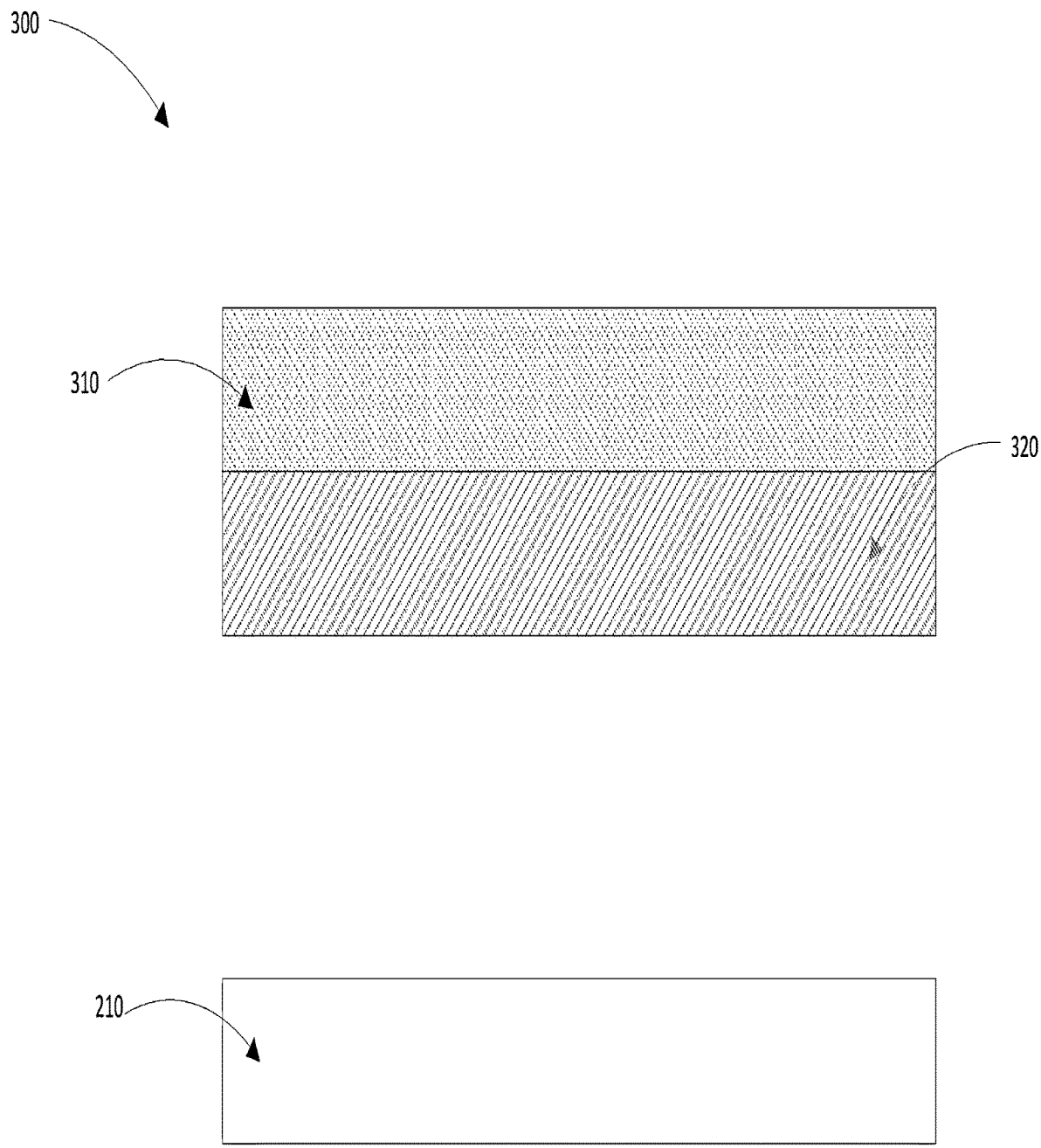
FIG. 3 shows a layered fabric according to some embodiments.

FIG. 3 shows layered fabric 300 in further detail. Layered fabric 300 comprises an absorbent layer 310 comprising a sheet of material having a high wettability, and a resistant layer 320 comprising a sheet of material having a low wettability. According to some embodiments, fabric 300 is a porous and/or permeable fabric.

While the terms high wettability and low wettability are used, it is to be understood that these terms are relative to each other, and that it is the difference in wettability between the layers that allows for fabric 300 to resist penetration by a target liquid. Each of layers 310 and 320 may be wettable by the target liquid on their own, which may be a low surface tension liquid. However, the configuration of the layers in the manner described creates a wettability difference that biases the outer layer 310 to absorb the liquid and the inner layer 320 to resist penetration of the liquid in a direction moving from the outer layer 310 to the inner layer 320, as described in further detail below.

The wettability of layer 310 is higher than the wettability of layer 320. Absorbent layer 310 is positioned on the outer side of resistant layer 320, so that resistant layer 320 is positioned to be closer to the skin 210 of a wearer when the wearer is wearing fabric 300. In some embodiments, layer 310 may be a PET or other polyester fabric, a wool, a cotton, a nano-spun fabric such as a nanofiber, or a blend such as a Modacrylic-cotton, for example. When worn with layer 320 positioned closer to the skin of the wearer than the layer 310, fabric 300 or a garment made of such fabric provides greater resistance to penetration of the liquid toward the skin of the wearer than either a fabric made from either the layer 310 or layer 320 on its own, or than a fabric or garment worn with the layer 310 positioned closer to the skin of a wearer than layer 320.

According to some embodiments, both layers 310 and 320 may be hydrophobic and/or superoleophobic. According to some embodiments, both layers 310 and 320 may have a low wettability to high surface tension liquids, such as water or oil. However, as noted above, both layers 310 and 320 may be wettable by low surface tension liquids, such as ethanol, for example. Resistant layer 320 may comprise a hydrophobic or super hydrophobic material in some embodiments. Resistant layer 320 may have a low wettability to high surface tension liquids. In some alternative embodiments, both layers 310 and 320 may be hydrophilic, or have a high wettability to high surface tension liquids. Absorbent layer 310 may comprise a hydrophilic or super hydrophilic material in some embodiments, or have a high wettability to high surface tension liquids. It is noted that hydrophobia and hydrophilia specifically relate to the relationship between a material and water, while wettability may refer to any liquid.

In some embodiments, layer 320 may comprise a material having a coating, such as a polyester fabric having a hydrophobic coating. For example, layer 320 may comprise a polyester or cotton fabric coated with one or more of FD-POSS, tridecafluorooctyl triethoxysilane (FAS) or PVDF-HFP using a dip coating method. According to some embodiments, the coating may comprise 100 ml acetone containing 1.0 g of FD-POSS and 5.0 g of FAS, or similar ratios, for example. According to some embodiments, the coating may comprise 100 ml acetone containing 0.7 g of FD-POSS and 3.0 g of FAS, or similar ratios, for example. According to some embodiments, the coating may comprise 100 ml of a solvent mixture of 50:50 vol/vol DMF and acetone containing 16 g of PVDF, or similar ratios, for example. According to some embodiments, layer 320 may comprise Nomex. Where layer 320 comprises a coated fabric, the coating may be between 30 nm and 50 nm thick in some embodiments.

According to some embodiments, the coating may be applied to layer 320 by directly applying a coating solution to layer 320 using a dip coating method. According to some embodiments, layer 320 may be immersed in the coating solution for at least 5 minutes, at least 10 minutes, or at least 20 minutes. According to some embodiments, the dip coated layer 320 may be squeezed to remove the extra solution, which may be done with a rubber roller, for example. Layer 320 may be dried at room temperature. According to some embodiments, layer 320 may alternatively or additionally be dried at a higher temperature, such as at 135°, for example. The higher temperature drying may be performed for a duration of around 30 minutes in some embodiments. According to some embodiments, the coating solution may be 100 ml acetone containing 1.0 g of FD-POSS and 5.0 g of FAS. In some embodiments, the coating solution may be acetone containing a different concentration of FD-POSS and FAS.

According to some embodiments, layer 310 may comprise a coating, which may be a coating such as that described above with respect to layer 320.

Layers 310 and 320 may each have a weight of around 150 to 170 g/m$^2$. Each of layers 310 and 320 may be around 450 to 6001 μm in thickness.

The wettability of a layer of fabric 300 may be measured based on the capillary wall contact angle of the layer, according to the Lucas-Washburn equation, as described below with reference to FIG. 5.

Figure 8:
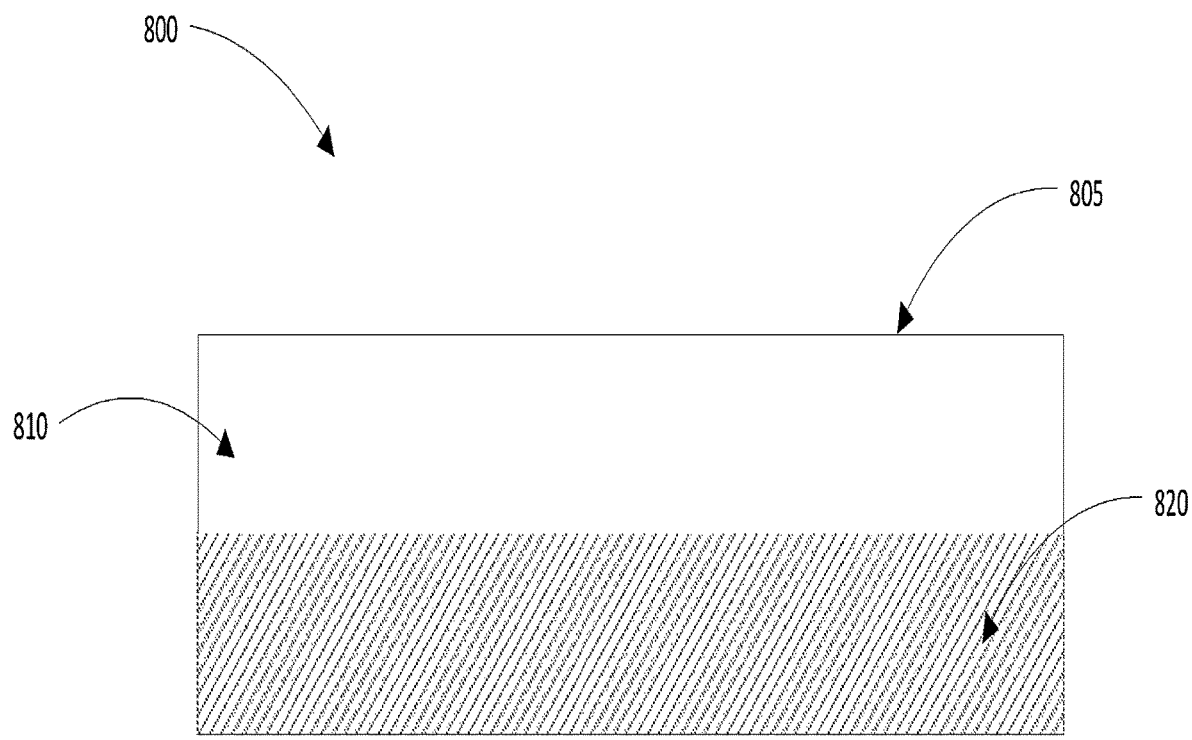
FIG. 8 shows a layered fabric formed from a single sheet according to some further embodiments.

While fabric 300 comprises two sheets of material 310 and 320, some embodiments relate to a fabric 800, as shown in FIG. 8. Fabric 800 comprises a single sheet of material 805 which starts as a single layer and is subject to processes that change the properties of sections of fabric 800, causing fabric 800 to develop layers having different behaviors. For example, layer 820 may be developed by applying a coating to one surface of fabric 800, while layer 810 may be the remaining uncoated part of fabric 800. The configuration of the layers 810 and 820 in the manner described creates a wettability difference that biases the outer layer 810 to absorb the liquid and the inner layer 820 to resist penetration of the liquid in a direction moving from the outer layer 810 to the inner layer 820, as described above with reference to layers 310 and 320 of FIG. 3.

According to some embodiments, the coating applied to fabric 800 may be applied by spray coating. For example, according to some embodiments the coating may be formed by spraying FD-POSS/FAS on one side of fabric 800 using a purpose-built spraying device. The coating thickness may be controlled by adjusting the amount of the coating solution to cause around the half of thickness of fabric 800 to be coated. After applying the coating, fabric 800 may be dried at room temperature. According to some embodiments, fabric 800 may alternatively or additionally be dried at a higher temperature, such as at 135°, for example. The higher temperature drying may be performed for a duration of around 30 minutes in some embodiments.

In some alternative embodiments, layers 810 and 820 may each be developed by applying different coatings to the opposing surfaces of fabric 300.

Figure 7:
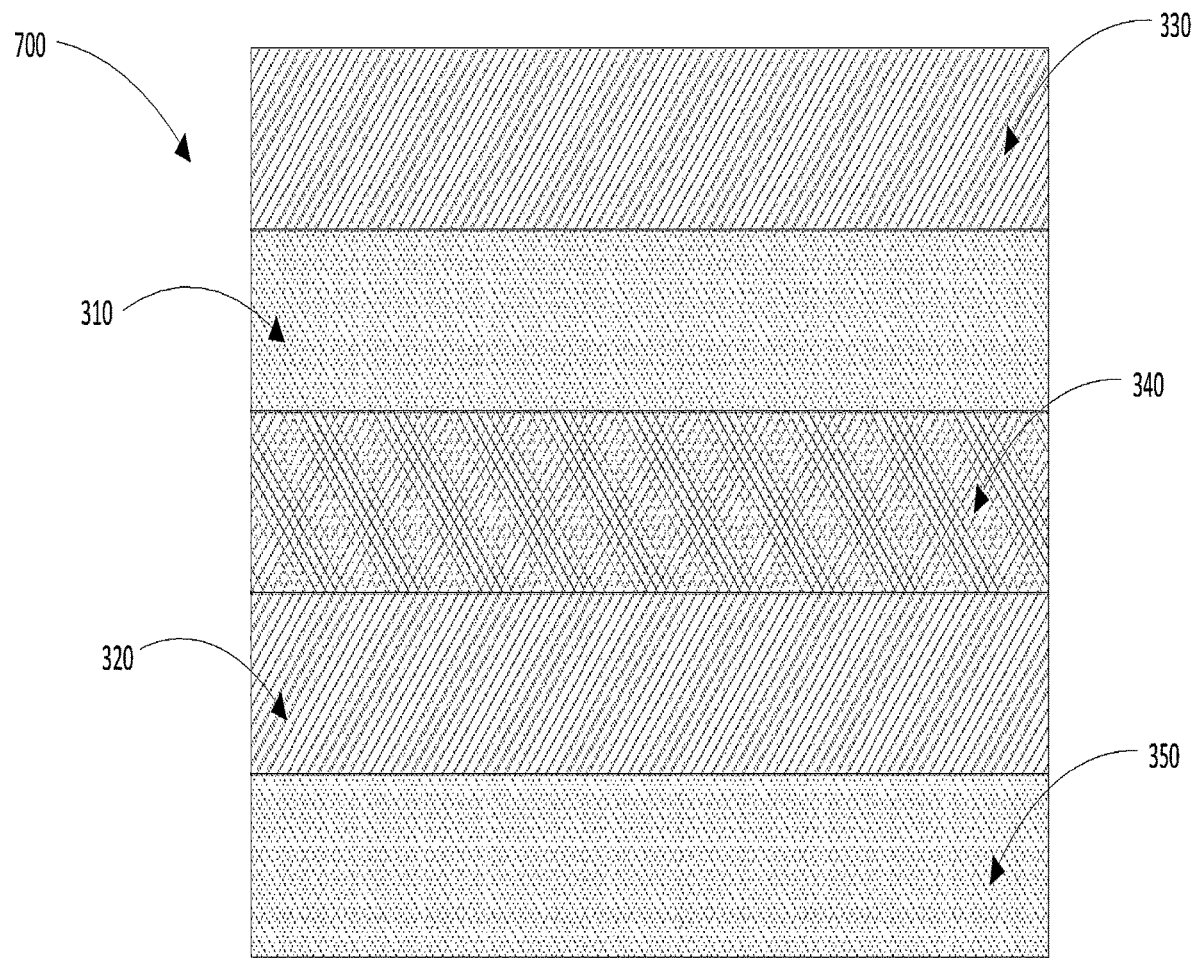
FIG. 7 shows a layered fabric according to some alternative embodiments.

FIG. 7 shows an alternative layered fabric 700. Layered fabric 700 comprises a high wettability or absorbent layer 310 and a low wettability or resistant layer 320, which have the same properties as described above with reference to FIG. 3. According to some embodiments, fabric 700 may alternatively comprise layers 810 and 820 which are formed from a single sheet to which at least one coating is applied, as described above with reference to FIG. 800.

Fabric 700 may also comprise further, optional layers. In the illustrated embodiment, Fabric 700 also comprises an optional carbon layer 340 While the illustrated embodiment shows carbon layer situated between layer 310 and layer 320, in some embodiments carbon layer 240 may be situated on the inside of layer 320. Carbon layer 340 may be made of activated carbon, and may be designed to absorb chemical vapour, resisting the penetration of chemical vapour through penetrating fabric 300.

Fabric 700 may also comprise an optional outer layer 330, which may comprise a low wettability layer. Outer layer 330 may be hydrophobic or super hydrophobic in some embodiments. Outer layer 330 may have a lower wettability than absorbent layer 310. According to some embodiments, outer layer 330 may comprise the same or similar material to layer 320. The inclusion of layer 330 may allow for fabric 300 to repel liquids with high surface tension, which may allow fabric 700 to be able to be rinsed, which may be particularly important if the outer surface of fabric 700 has been exposed to harmful liquid chemicals. Outer layer 330 may therefore be a rinsable or washable layer in some embodiments.

Fabric 700 may also comprise an optional inner layer 350, which may comprise a high wettability layer. Inner layer 350 may be hydrophilic or super hydrophilic in some embodiments. Inner layer 350 may have a higher wettability than resistant layer 320. According to some embodiments, inner layer 350 may comprise the same or similar material to layer 310. According to some embodiments, layer 310 may have a higher wettability than layer 350. The inclusion of layer 350 may provide added comfort and wearability to fabric 350, by providing a soft and absorbent layer next to the skin 210 of the user, to absorb any moisture such as sweat from skin 210. Inner layer 350 may therefore be a comfort layer in some embodiments.

While fabric 700 is described as a layered fabric, in some embodiments fabric 700 may start as a single layer and be subject to processes that change the properties of sections of fabric 700, causing fabric 700 to develop layers having different behaviors. For example, layer 320 may be developed by applying a coating to fabric 700, while layer 310 may be the remaining uncoated part of fabric 700. In some embodiments, layers 310 and 320 may each be developed by applying different coatings to the opposing surfaces of fabric 700.

Figure 4:
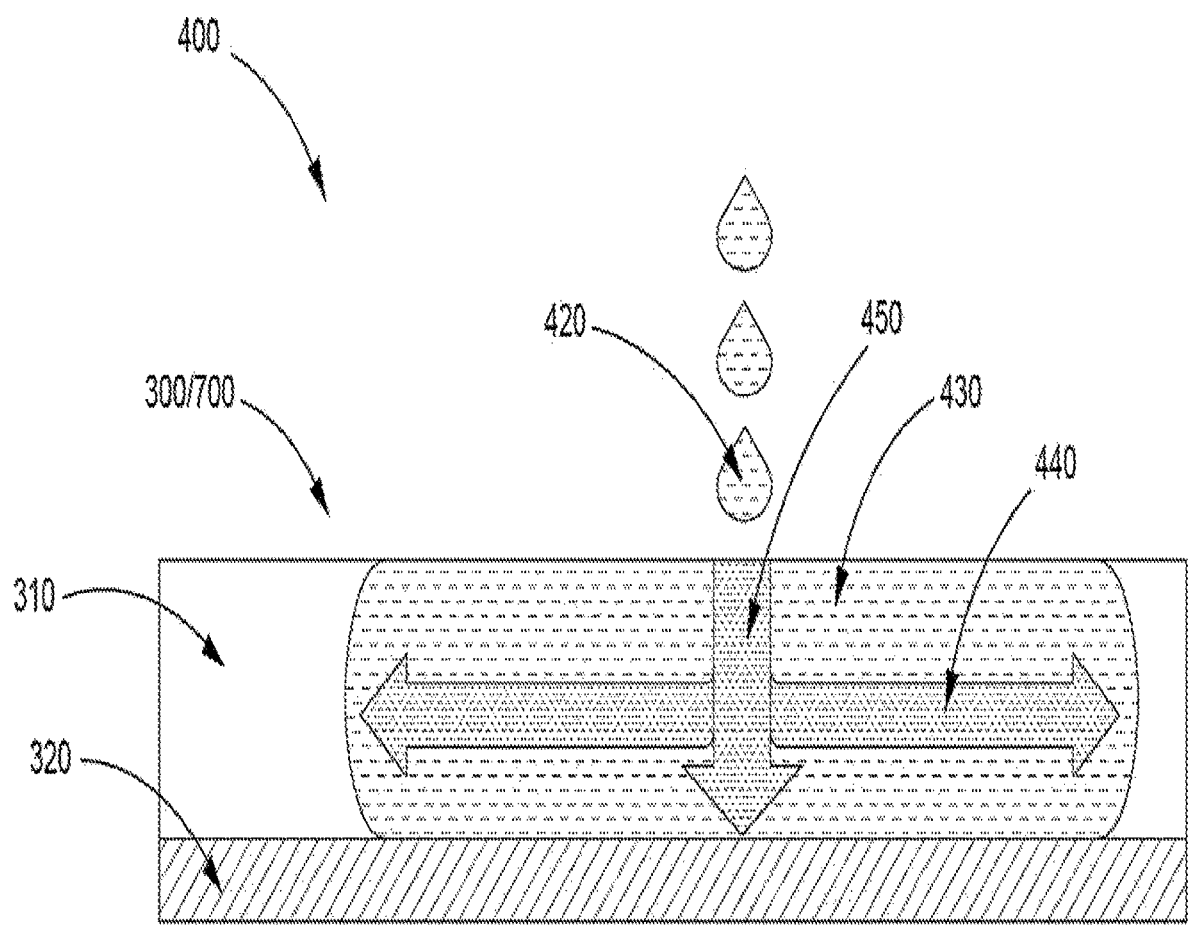
FIG. 4 shows a liquid passing through the fabric of FIG. 3.

FIG. 4 shows the path of the liquid 420 with respect to a layered fabric 300 or 700 that is in contact with a wearer's skin 210. The layered fabric 300 or 700 as illustrated in FIG. 4 comprises only layers 310 and 320. According to some embodiments, one or more of layers 330, 340 and 350 may also be included.

Liquid 420 starts by dropping onto the surface of layer 310. Layer 310 absorbs the liquid by in-plane diffusion, forming absorbed liquid 430 and preventing layer 320 from contacting the liquid. Liquid 430 is absorbed along the direction shown by arrows 440, along the length of layer 110 of fabric 300 or 700. Some of absorbed liquid 430 will also be absorbed along the direction shown by arrow 450. However, this liquid contacts layer 320, which resists absorption of the liquid 430. As layer 320 will take a long time to absorb liquid 420, the liquid will instead continue to be absorbed by layer 310, resulting in the fabric 300/700 tending to resist penetration of liquid 420 until layer 310 has reached its absorption capacity.

While the above is described with reference to layers 310 and 320 of fabric 300 or 700, it should be appreciated that the same effect is achieved with layers 810 and 820 of fabric 800.

When an experiment was done by dropping 200 μL ethanol onto a dual layer fabric similar to fabric 300, the ethanol rapidly spread on the outer layer 310 without penetrating to reach the inner layer 320. As a result, inner surface 320 remained dry. This result suggests that fabric 300 shows different wicking performance between the two surfaces of layers 310 and 320 compared to fabric 100, and this wicking prevents liquid penetration when liquid is fed from layer 310 having a higher wettability.

Specifically, in the experiment a polyester fabric (marked "A") and a polyester fabric coated with a polymer solution (marked "B") were tested for wettability using pure ethanol as a low surface tension liquid. Both the uncoated fabric A and coated fabric B showed similar surface morphology because the coating was very thin, at ~50 nm. Fabrics A and B were both were wetted by ethanol with a static contact angle of 0°. When 10 μL of ethanol was dropped on sample A, its contact angle changed from 20° to zero in less than 1 second. For fabric B, the ethanol contact angle reduced from 115° to zero in a much longer period (30 seconds). The shorter spread time for A than B suggests that the uncoated PET had higher wettability to ethanol than the coated fabric.

The fabrics A and B were laminated together to get four possible combinations of a dual-layered fabric, being A/A, A/B, B/A, and B/B. Following this, ethanol was dropped to the laminated fabric assemblies to observe its spreading on the fabrics. When 200 ethanol was dropped onto the dual-layer fabric at the B surface of fabric B/A, the ethanol spread on the top B layer then moved freely through the fabric and quickly spread to the bottom A layer. It took 0.72 seconds for ethanol to transport from the feeding to the back surface of layer A. When the same volume of ethanol was fed onto the A surface of fabric A/B, the ethanol only spread on the A layer without spreading into the layer B behind. As a result, the B surface remained dry in the entire process. For the dual-layer fabrics made of two layers of the same fabric, being A/A and B/B, similar wicking performance to the single fabric samples were observed, and these dual-layer fabrics were unable to prevent ethanol penetration. The A/A fabric showed a shorter penetration time (0.08 seconds) than the B/B fabric. This can be explained by the lower ethanol wettability for fabric B than fabric A.

These results indicate that the wettability difference between the fabric layers plays a key role in preventing ethanol penetration across the dual-layer fabric. The A/B dual-layer fabrics show different wicking performances depending on the combination configuration, and ethanol penetration can be prevented when the liquid is fed from the layer with higher wettability.

The maximum volume of ethanol that can be blocked by the dual-layer A/B fabric was also measured by dropping ethanol on one spot of the A surface until the ethanol started penetrating across the two-fabric layer. The maximum absorption capacity was found to depend mainly on the absorption capacity of fabric A and the wettability difference between fabrics A and B. The absorption capacity of fabric A may depend on factors such as the fabrics structure and the viscosity of the liquid. If the time taken to reach the absorption capacity of layer A is less than the time required to start wetting layer B, layer A will be fully loaded before the ethanol starts to travel to layer B resulting in the maximum volume being absorbed. Otherwise, if the time taken to reach the absorption capacity of layer A is greater than the time taken to begin wetting layer B, the ethanol will begin to penetrate layer B before reaching the maximum capacity of layer A, hence not reaching the maximum volume.

The maximum volume absorbed by fabric A/B was 220 μl. The ethanol dropped covered 8.12 $cm^2$ area of the A surface. The diameter of ethanol spread on the top surface was approximately 3.22 cm. Therefore, the volume of the ethanol per unit area of the fabric A/B to prevent liquid penetration was 27.09111/cm². Based on this data, one can estimate the volume of ethanol that can be blocked using a specific configuration of the fabric, assuming that the ethanol is uniformly applied to the A-side of the fabric. When dropping ethanol on the same thickness of the B/A fabric but applied to the B side, the maximum volume absorbed was only 3 µl, which is 70 times less than for fabric A/B. For the A/A and B/B dual layer fabrics, the maximum volumes absorbed were less than 2 µl. Apart from ethanol, other low surface tension liquids, such as 2-chloroethyl phenyl sulfide, diethyl chlorophosphate, triethyl phosphate, and diisopropyl methylphosphonate were tested using the dual fabrics A/B, A/A, and B/B, and similar wicking performances were observed.

By increasing the wettability difference between layers 310 and 320 or 810 and 820, it may be possible to increase the capacity of fabric 300, 700 or 800 in preventing liquid penetration by 200 to 1000 times compared to fabric 100, while maintaining the same or even a lower thickness and weight, and keeping the same or even a higher flexibility, heat transfer and air-permeability. As well as being used for CPC and other liquid protection garments, fabric 300, 700 and 800 may be used for preventing liquid penetration in other applications, such as applications relating to hygiene, food preparation, soil water retention and sports clothing, for example.

Figure 5:
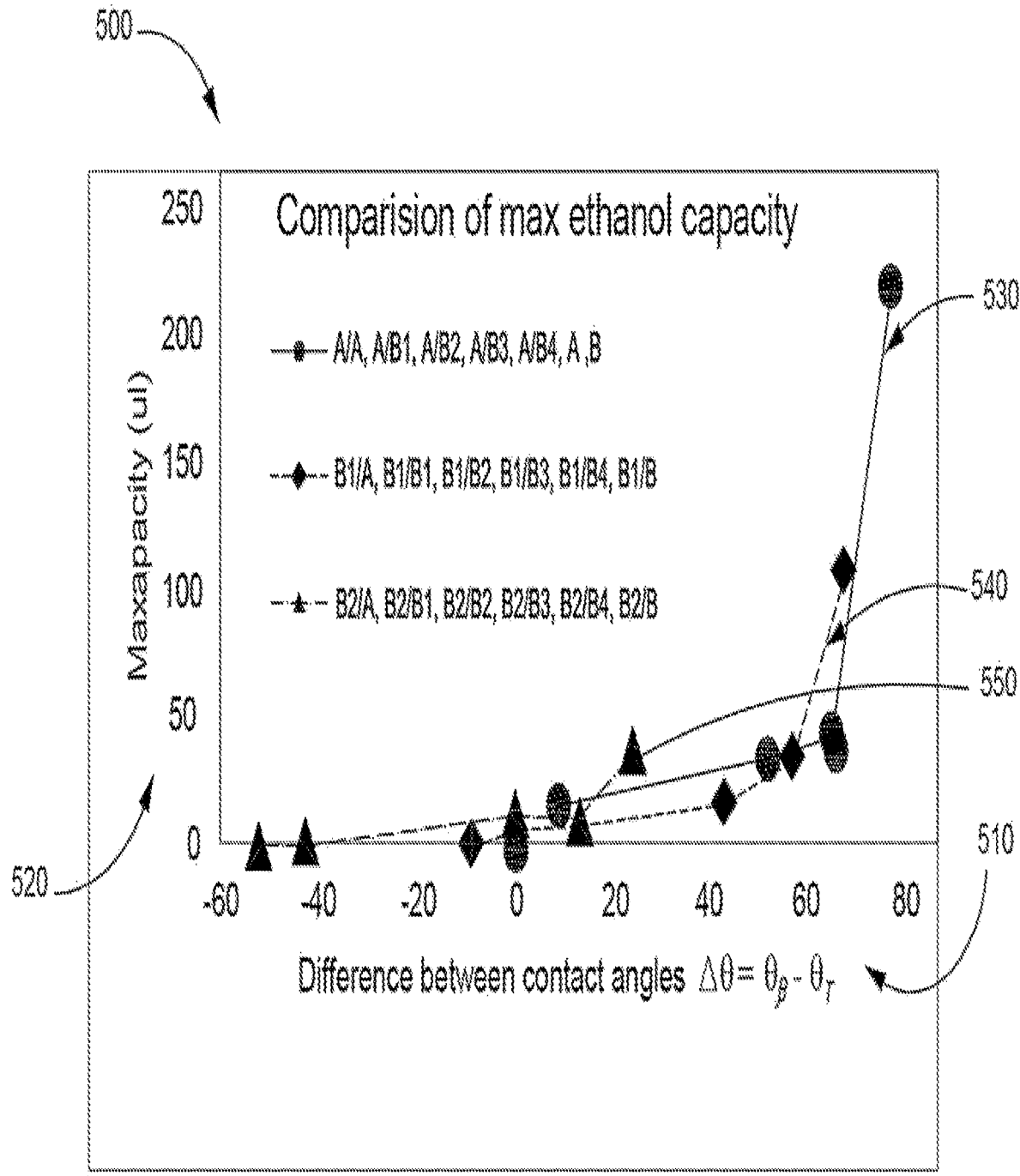
FIG. 5 shows a graph comparing the liquid capacity of a range of layered fabrics having different contact angles.

FIG. 5 shows a graph 500 showing the effect of capillary contact angle difference on the liquid capacity of a number of dual layer fabrics. In contrast to the contact angle, which describes the angle that a liquid creates with a flat solid surface, a capillary contact angle refers to the contact angle between a liquid and a tube wall, or capillary. The capillary contact angle relates to the ability of the liquid to fill small capillaries or pores, such those inside or between the fibres of a fabric.

Graph 500 has an x-axis 510 showing a contact angle difference between the layers of a number of tested fabrics, $\Delta\theta = \theta_\beta - \theta_\tau$. Graph 500 further has a y-axis 520 showing a maximum capacity in µL for each of the tested fabrics. Each dual layer fabric was tested for the volume of ethanol it could hold, and the results were recorded and graphed.

18 dual layer fabrics were tested. The two layers of each dual layer fabric were selected from polyester (marked "A"), and five types of coated polyester (marked "B1", "B2", "B3", "B4" and "B") having five different concentrations of FD-POSS/FAS to produce five different wettabilities. Each of the tested layers were wettable to ethanol and had a static contact angle of 0° for ethanol.

The corresponding wicking height for each layer was measured, and the results are reproduced below in Table 1. The time taken for each layer to wick 1 cm was also recorded. For layer B, it took 195 seconds for the ethanol to wick 1 cm up, which was 192.4 seconds slower than it took the ethanol to reach the same height on layer A. Layer B also showed a significantly lower total wicked height compared to layer A. While layer A was able to wick ethanol to a height of 9 cm, layer B was 7 cm lower, with a maximum height of 2 cm.

TABLE 1

| maximum wicking height of each tested layer | | | | | | |
|---|---|---|---|---|---|---|
| | A | B1 | B2 | B3 | B4 | B |
| Max Wicking Height (mm) | 90 | 88 | 61 | 44 | 45 | 20 |

The wicking times for each fabric to reach a wicking height of 10 mm were also recorded, and are reproduced below in Table 2.

TABLE 2

| maximum wicking height of each tested layer | | | | | | |
|---|---|---|---|---|---|---|
| | A | B1 | B2 | B3 | B4 | B |
| Wicking time (s) | 2.56 | 2.6 | 5.6 | 13 | 14 | 195 |

Layers A, B, B1, B2, B3 and B4 were fabricated to create a series of dual layer fabrics, and the maximum liquid capacity of the dual layer fabrics was also measured.

The wicking height L achieved in a time t can be described for a particular fabric with the Lucas-Washburn equation, $$L = \sqrt{\frac{\gamma r t \cos(\phi)}{2\eta}},$$

where φ is the contact angle between the liquid and the idealized capillary wall within the fabric, r is the radius of the idealized capillary, η is the dynamic viscosity of the liquid, and γ is the surface tension.

Using the Lucas-Washburn equation, the contact angle difference between two fabrics or two fabric layers can be calculated based on the wicking height of each fabric or layer.

Since η, γ, and r are almost identical between the samples A, B1, B2, B3, B4 and B, the difference in wicking height is only determined by the contact angle. Therefore, the wicking height and contact angle for different samples have the following relationship:

$$\cos\theta_1 = \frac{L_1^2}{L_2^2} \times \cos\theta_2$$

where $L_1$ and $\theta_1$ are the maximum wicking height and capillary contact angle of the first sample, and $L_2$ and $\theta_2$ are the maximum wicking height and capillary contact angle of the second sample.

This can also be determined using the relationship between the wicking time and contact angle for different samples, being:

$$\cos\theta_1 = \frac{t_2}{t_1} \times \cos\theta_2$$

where $t_1$ and $\theta_1$ are the wicking time to reach wicking height of 10 mm and capillary contact angle of sample 1; $t_2$ and $\theta_2$ are the wicking time to reach wicking height of 10 mm and capillary contact angle of sample 2.

A smooth PET film was used as the uncoated layer A, with a capillary contact angle of 11.08°. Based on the above equations and according to the wicking height and time data, the capillary contact angles for the other samples were obtained based on the above equations, as listed below in Table 3.

TABLE 3 calculated capillary contact angles for each dual layer fabric

| Sample | Top θ | Bottom θ | Δθ | Average (ul) |
|---|---|---|---|---|
| A/A | 11.08 | 11.09 | 0 | 1.00 |
| A/B1 | 11.08 | 20.24 | 9.16 | 16.67 |
| A/B2 | 11.08 | 63.20 | 52.12 | 33.33 |
| A/B3 | 11.08 | 75.79 | 64.72 | 41.67 |
| A/B4 | 11.08 | 76.43 | 65.36 | 38.33 |
| A/B | 11.08 | 87.22 | 76.14 | 220.00 |
| B1/A | 20.24 | 11.08 | −9.16 | 1.00 |
| B1/B1 | 20.24 | 20.24 | 0 | 6.67 |
| B1/B2 | 20.24 | 63.20 | 42.96 | 16.67 |
| B1/B3 | 20.24 | 75.79 | 55.56 | 31.67 |
| B1/B4 | 20.24 | 76.43 | 56.19 | 3500 |
| B1/B | 20.24 | 87.22 | 66.97 | 106.67 |
| B2/A | 63.20 | 11.08 | −52.12 | 1.00 |
| B2/B1 | 63.20 | 20.24 | −42.96 | 1.00 |
| B2/B2 | 63.20 | 63.20 | 0 | 11.67 |
| B2/B3 | 63.20 | 75.79 | 12.59 | 8.33 |
| B2/B4 | 63.20 | 76.43 | 13.23 | 11.67 |
| B2/B | 63.20 | 87.22 | 24.019 | 36.67 |

For fabrics A and B, the difference in contact angle AO was calculated to be 76.1°.

FIG. 5 shows the relationship between the maximum liquid capacity and the difference in contact angle for the tested fabrics. Plot 530 shows dual layer fabrics having layer A as the top fabric, plot 540 shows dual layer fabrics having layer B1 as the top fabric, and plot 550 shows dual layer fabrics having layer B2 as the top fabric. Larger differences in contact angle led to higher maximum capacities, resulting in the improved fabric as described above with reference to FIGS. 3, 4, and 7. This phenomenon is described in further detail below with reference to capillary force within the yarn fibres of a fabric.

As seen from FIG. 5, an increase in capacity is seen in dual layer fabrics having a capillary contact angle difference of at least 50°, and a significant increase in capacity is seen in dual layer fabrics having a capillary contact angle difference of at least 65°. Based on these results, fabric 300, 700 or 800 may be manufactured so that the contact angle difference between layers 310 and 320 or 810 and 820 is at least 50°. According to some embodiments, fabric 300, 700 or 800 may be manufactured so that the contact angle difference between layers 310 and 320 or 820 and 820 is at least 60°. In some embodiments, fabric 300, 700 or 800 may be manufactured so that the contact angle difference between layers 310 and 320 or 810 and 820 is at least 65°. According to some embodiments, fabric 300, 700 or 800 may be manufactured so that the contact angle difference between layers 310 and 320 or 810 and 820 is at least 70°.

A woven fabric made of multifilament yarns has two types of pores within it, being smaller pores within the yarn between fibres, and coarser pores between the adjacent yarns. The pores within the yarn may be referred to as intra-yarn pores, and can be idealized as cylindrical shapes. The pore diameter of the intra-yarn pores is decided by the inter-fibre distance (d). The pores between yarns may be knows as inter-yarn pores, and are generally irregular in size and shape, with their size (D) decided by the yarn diameter and weaving structure.

The capillary force of an idealized cylindrical capillary can be determined by the equation:

$$F = \frac{2\gamma\cos\theta}{r}.$$

Within a single fabric layer, F is mainly determined by the radius of the pores. Since the diameter of the intra-yarn pores d is much smaller than the diameter of the inter-yarn pores D, the capillary force within each yarn fibre is significantly larger than that between the yarn fibres. When liquid attaches to fabric, the movement of the liquid along an in-plane direction within each yarn fibre is a lot faster than that along the cross-plane. When two layers of fabrics are laminated, larger pores are created between the layers, slowing down cross-plane wicking. When the second layer has a lower wettability than the first layer, the corresponding capillary forces are smaller. If the liquid dropped in the first layer is entirely consumed by the in-plane wicking, there will be no liquid drawn into the second layer. As a result, no liquid penetration across the second layer happens.

Figure 6:
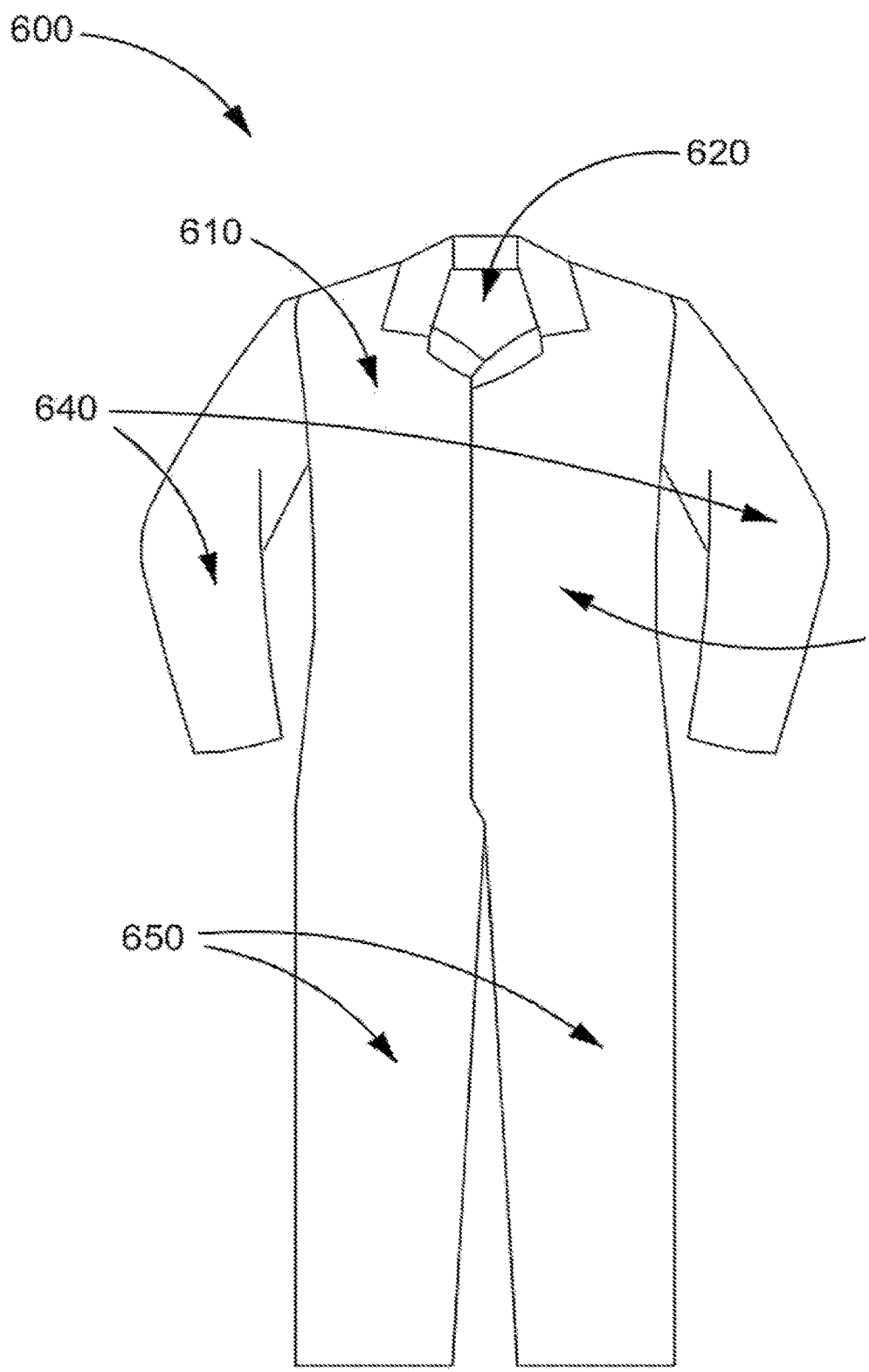
FIG. 6 shows a garment made from the fabric of FIG. 3.

FIG. 6 shows an example protective garment 600 comprising fabric 300, 700 or 800. Protective garment 600 may be designed to isolate a wearer from hazardous liquid industrial chemicals (TICs), chemical warfare agents (CWAs) and other harmful liquids, vapours, and aerosols.

Garment 600 comprises an external surface 610 and an internal surface 620. Internal surface 620 is configured to be positioned closer to the skin of a wearer than external surface 610 when garment 600 is worn. External surface 610 is configured to be exposed to the environment of the wearer. Features of the garment such as pockets, seams and closures may be located taking into account which surface is configured to be the internal surface 620 and which surface is configured to be external surface 610. For example, closures such as zippers and buttons may be configured to be accessed from external surface 610. Seams may be sewn such that seam allowances are configured to be on internal surface 620. Pockets may be located on both internal surface 620 and external surface 610 depending on their location. For example, pockets designed to be located on the lower half of the body, such as on the legs or hips, may be designed to be accessed from external surface 610. Some pockets located on the upper body may be configured to be accessible from internal surface 620, such as internal breast pockets.

As illustrated, garment 600 is designed to cover a relatively large proportion of the wearer's body, with garment 600 being a coverall style garment. Garment 600 includes a bodice 630 configured to cover a torso of a wearer. Garment 600 further includes sleeves 640 configured to cover the arms of a user, and pant legs 650 configured to cover the legs of a user.

According to some alternative embodiments, garment 600 may be a different type of garment. For example, garment 600 may be a face mask configured to cover a face of a user; a vest configured to cover the torso of a user; a jacket configured to cover the torso and arms of a user; pants configured to cover the legs of a user; gloves configured to cover the hands of a user; or socks, configured to cover the feet of a user, for example.

According to some embodiments, fabric 300, 700 or 800 may be cut and sewn to create garment 600. According to some alternative embodiments, fabric 300, 700 or 800 may be shaped into garment 600 at the time of manufacture. When used to create garment 600, fabric 300, 700 or 800 may be oriented so that layer 350, 320 or 820 forms internal surface 620, and so that layer 330, 310 or 810 forms external surface 610.

While described embodiments have generally been described as suitable for use as protective clothing, those skilled in the art will recognise that the described embodiments may be used in other products, including baby nappies, hygiene products, wound care, food preparation, soil water retention, and sporting/camping/ski equipment and clothing.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A garment for resisting penetration of a target liquid, the garment comprising a dual layer fabric, the dual layer fabric comprising:
   an outer layer; and
   an inner layer;
   wherein both the inner layer and outer layer comprise hydrophobic or superhydrophobic material;
   wherein the inner layer is to be positioned closer to the skin of a wearer than the outer layer when the garment is being worn;
   wherein each of the inner layer and the outer layer on their own are wettable by the target liquid;
   wherein the inner layer has a lower wettability to the target liquid than the outer layer;
   wherein the surface tension of the target liquid is less than 50 $mNm^{-1}$; and
   wherein the configuration of the inner and outer layers create a wettability difference that biases the outer layer to absorb the target liquid and the inner layer to resist penetration of the target liquid in a direction moving from the outer layer to the inner layer.

2. The garment of claim 1, wherein the surface tension of the target liquid is less than 30 $mNm^{-1}$, and both the outer layer and the inner layer are superoleophobic.

3. The garment of claim 1, wherein the surface tension of the target liquid is less than 40 $mNm^{-1}$.

4. The garment of claim 1, wherein the surface tension of the target liquid is less than 30 $mNm^{-1}$.

5. The garment of claim 1, wherein the garment is air-permeable.

6. The garment of claim 1, wherein the inner layer and the outer layer are formed from a single sheet, with different coatings applied for defining the inner and outer layers respectively; or wherein the inner and outer layers are laminated together.

7. The garment of claim 1, further comprising an inner comfort layer that is to be positioned to be closer to the skin than the inner layer, wherein the inner comfort layer has a higher wettability than the inner layer.

8. The garment of claim 7, wherein the inner comfort layer is hydrophilic or superhydrophilic.

9. The garment of claim 1, further comprising an outer rinsable layer that is to be positioned further from the skin than the outer layer, wherein the outer rinsable layer has a lower wettability than the outer layer.

10. The garment of claim 9, wherein the outer rinsable layer is hydrophobic or superhydrophobic.

11. The garment of claim 1, further comprising a carbon layer that is configured to absorb vapour, wherein the carbon layer is positioned on the inside of the inner layer.

12. The garment of claim 11, wherein the carbon layer includes activated carbon.

13. The garment of claim 1, wherein a difference in the capillary contact angle between the outer layer and the inner layer is at least 50°.

14. The garment of claim 1, wherein a difference in the capillary contact angle between the outer layer and the inner layer is at least 60°.

15. The garment of claim 1, wherein the garment is to cover at least one of a torso, an arm, a leg, a face, a hand and a foot of the wearer when the garment is being worn.

16. The garment of claim 1, wherein the garment includes at least one of a coverall, a jacket, a pair of pants, a vest, a facemask, a glove or a sock.

17. The garment of claim 1, wherein the inner layer comprises a first coating and the outer layer comprises a second coating.

18. The garment of claim 17, wherein the first and second coatings comprise one or more of FD-POSS, tridecafluorooctyl triethoxysilane (FAS), and/or PVDF-HFP.

19. The garment of claim 18, wherein the first and second coatings comprise different concentrations of FD-POSS/FAS.

20. The garment of claim 17, wherein the inner layer and the outer layer comprise coated polyester or cotton fabric.

21. The garment of claim 1, wherein both the inner layer and the outer layer are superhydrophobic.

22. The garment of claim 1, wherein the target liquid is hazardous to the wearer; and/or wherein the target liquid is a chemical warfare agent.

23. The garment of claim 1, wherein, to create the wettability difference for resisting penetration of the target liquid, the outer layer and inner layer of the dual layer fabric comprise:
   different concentrations of the same hydrophobic or superhydrophobic material; and/or
   different hydrophobic or superhydrophobic material.

* * * * *